United States Patent
Hays et al.

(10) Patent No.: US 9,699,239 B1
(45) Date of Patent: Jul. 4, 2017

(54) SYSTEMS AND METHODS FOR CONTACT MANAGEMENT

(71) Applicant: Televoice, Inc., Houston, TX (US)

(72) Inventors: Barry Hays, Katy, TX (US); Greg St. Denis, Houston, TX (US)

(73) Assignee: Televoice, Inc., Houston, TX (US)

( * ) Notice: Subject to any disclaimer, the term of this patent is extended or adjusted under 35 U.S.C. 154(b) by 109 days.

(21) Appl. No.: 13/694,871

(22) Filed: Jan. 14, 2013

Related U.S. Application Data

(63) Continuation of application No. 61/586,006, filed on Jan. 12, 2012.

(51) Int. Cl.
| | |
|---|---|
| *G06F 15/16* | (2006.01) |
| *H04M 3/00* | (2006.01) |
| *G06Q 10/00* | (2012.01) |
| *H04L 29/08* | (2006.01) |
| *H04M 3/42* | (2006.01) |
| *G06Q 30/02* | (2012.01) |

(52) U.S. Cl.
CPC ............. *H04L 67/02* (2013.01); *G06Q 30/02* (2013.01); *H04M 3/42221* (2013.01)

(58) Field of Classification Search
CPC ............... H04L 29/08072; H04L 29/06; H04L 29/08135; H04L 29/08144; H04L 29/0809; H04M 3/42221; H04M 3/51; H04M 3/5175; H04M 3/5183; H04M 3/523; G06Q 30/02; G06Q 10/10; G06Q 10/06; G06Q 30/06; G06Q 30/0601
USPC ................................................. 709/200, 201
See application file for complete search history.

(56) References Cited

U.S. PATENT DOCUMENTS

| | | | | |
|---|---|---|---|---|
| 6,044,146 | A  * | 3/2000  | Gisby     | H04L 29/06 379/266.02 |
| 6,314,177 | B1 * | 11/2001 | Davis     | H04M 3/5233 379/265.12 |
| 6,618,778 | B1 * | 9/2003  | MacCormack | G06F 13/364 710/241 |
| 6,859,529 | B2   | 2/2005  | Duncan et al. | 379/266.1 |
| 6,956,941 | B1   | 10/2005 | Duncan et al. | 379/265.01 |
| 8,958,542 | B1 * | 2/2015  | Kaufman | H04M 3/00 379/265.11 |
| 2002/0141561 | A1 * | 10/2002 | Duncan | H04L 51/04 379/220.01 |
| 2002/0143597 | A1 * | 10/2002 | Andre | G06Q 10/06311 705/7.14 |
| 2002/0143843 | A1 * | 10/2002 | Mehta | G06F 9/4881 718/102 |
| 2003/0171942 | A1 * | 9/2003  | Gaito | G06Q 10/10 705/1.1 |
| 2005/0044129 | A1 * | 2/2005  | McCormack | G06Q 10/063112 709/200 |
| 2006/0239441 | A1 * | 10/2006 | Yang | H04M 3/5191 379/265.11 |
| 2009/0180607 | A1 * | 7/2009  | Kamlet | H04M 3/5233 379/265.12 |

(Continued)

*Primary Examiner* — Mahran Abu Roumi
(74) *Attorney, Agent, or Firm* — Norton Rose Fulbright US LLP

(57) ABSTRACT

Systems and methods for contact management, such as those, for example, configured to identify a point-of-contact to which at least one contact is assigned and/or configured to order at least one contact based on information relating to the at least one contact.

15 Claims, 18 Drawing Sheets

(56) References Cited

U.S. PATENT DOCUMENTS

| | | | |
|---|---|---|---|
| 2011/0231536 A1* | 9/2011 | Tanaka | H04L 65/4084 709/223 |
| 2012/0224681 A1* | 9/2012 | Desai | H04M 3/5166 379/266.1 |
| 2012/0321072 A1* | 12/2012 | Dooley | H04M 3/5233 379/265.12 |

* cited by examiner

| Scoring Element | Value | Comments |
|---|---|---|
| MSP Fields | | |
| 83 Days Delinquent | 15 | |
| 173 Days Delinquent | 10 | |
| 0-30 Days Delinquent & 25 days since completed BRP | 40 | |
| LMT3 Step 1 | | |
| LMT3 Step 2 | | |
| LMT3 Step 3 | | |
| LMT3 Step 4 | | |
| LMT3 Step 5 | | |
| LMT3 Step 6 | | |
| Man Code = F | | |
| Man Code = B | | |
| Lo Type = x | | |
| Hi Type = x | | |
| State Code = | | |
| State Code = | | |
| State Code = | | |
| State Code = | | |
| State Code = | | |
| Investor Code = | | |
| Investor Code = | | |
| Foreclosure Date within 37 days | 35 | |
| Foreclosure Date within 14 days | 5 | |
| SCRA Active | | |
| Foreclosure Active | | |
| Loss Mit Active | 25 | |
| 53 days from completed BRP | 20 | |
| Escalated Loan | 30 | |

FIG. 2A

| Scoring Element | Value | Comments |
|---|---|---|
| Call Timing | | |
| On hold threshold (3 min) | 20 | |
| On hold threshold x 2 | | |
| On hold threshold x 3 | | |
| Call Back threshold (15 min) | 10 | |
| Call Back threshold x 2 | | |
| Call Back threshold x 3 | | |
| Voicemail threshold | | |
| Voicemail threshold x 2 | | |
| Voicemail threshold x 3 | | |
| Campaign threshold | | |
| Campaign threshold x 2 | | |
| Campaign threshold x 3 | | |

| Scoring Element | Value | Comments |
|---|---|---|
| Call Type | | |
| Inbound | 45 | |
| Campaign 1 - Welcome | 10 | |
| Campaign 2 - Missing BRP | 30 | |
| Campaign 3 - Decision | 25 | |
| Campaign 4 - Missing Trial | 15 | |
| Campaign 5 - Final DOCs | 20 | |
| Campaign 6 - FC only Follow Up | 5 | |
| Varolii | | |
| Agent Assigned Call Back | 40 | |
| Borrower Assigned Call Back | | |
| Supervisor Assigned Call Back | | |
| Agent Ad Hoc Call Back | | |
| Abandon Call Back | | |
| Voicemail | 35 | |

FIG. 2C

| Scoring Element | Value | Comments |
|---|---|---|
| Call History | | |
| Multiple calls today | 20 | |
| x Calls in last week | | |
| Previous abandon | 30 | Same day call back after previous abandon. |
| Inbound return | 10 | Returned call same day as outbound call to borrower. |

| Call Type | Scenario 1 | | Scenario 2 | | Scenario 3 | | Scenario 4 | | Scenario 5 | |
|---|---|---|---|---|---|---|---|---|---|---|
| | Value | Score | Value | Score | Value | Score | Value | Score | Value | Score |
| | 0 | | 0 | | 0 | | 0 | | 0 | |
| Inbound | | | | | | | | | | |
| Campaign 1 - Welcome | 0 | | 0 | | 0 | | 0 | | 0 | |
| Campaign 2 - Missing BRP | 0 | | 0 | | 0 | | 0 | | 0 | |
| Campaign 3 - Decision | 0 | | 0 | | 0 | | 0 | | 0 | |
| Campaign 4 - Missing Trial | 0 | | 0 | | 0 | | 0 | | 0 | |
| Campaign 5 - Final DOCs | 0 | | 0 | | 0 | | 0 | | 0 | |
| Campaign 6 - FC only Follow Up | 0 | | 0 | | 0 | | 0 | | 0 | |
| Vendor | 0 | | 0 | | 0 | | 0 | | 0 | |
| Agent Assigned Call Back | 0 | | 0 | | 0 | | 0 | | 0 | |
| Borrower Assigned Call Back | 0 | | 0 | | 0 | | 0 | | 0 | |
| Supervisor Assigned Call Back | 0 | | 0 | | 0 | | 0 | | 0 | |
| Agent Ad Hoc Call Back | 0 | | 0 | | 0 | | 0 | | 0 | |
| Abandon Call Back | 0 | | 0 | | 0 | | 0 | | 0 | |
| Voicemail | 0 | | 0 | | 0 | | 0 | | 0 | |

```
POC1 1234567890              POINTS OF CONTACT                      08/12/11  12:00:00
MTGR: BOB BORROWER      COMGR: BETH BORROWER       TYPE: 16

POC LEVEL  ID  RSN    POC NAME              PHONE           EXT    CHNGD BY
    EMAIL
--------------------------------------------------------------------------------
MASTER    B29  01    SCOTT WALKER          0123456789      1234     BOI  08/12/11
  M.SCOTT.WALKER@US.SERVICER.SHOP.COM.NET.BIZ.DOT.ETC...
BANKRPCY  B30  01    STEVE JONES           0123456789      1234     BOI  08/12/11
  STEVEN.JONES@US.SERVICER.SHOP.COM.NET.BIZ.DOT.ETC...
FORECLSR  B31  01    BILLY SMYTHE          0123456789      1234     BOI  08/12/11
  WILLIAM.SMYTHE@US.SERVICER.SHOP.COM.NET.BIZ.DOT.ETC...
LOSS MIT  B32  01    LISA JOHNSON          0123456789      1234     BOI  08/12/11
  LISA.JOHNSON@US.SERVICER.SHOP.COM.NET.BIZ.DOT.ETC...
MNGMT     B33  01    KAREN WILLIAMS        0123456789      1234     BOI  08/12/11
  KAREN.WILLIAMS@US.SERVICER.SHOP.COM.NET.BIZ.DOT.ETC...
SVC RELIEF B34 01    CARRIE KERWIN         0123456789      1234     BOI  08/12/11
  CARRIE.KERWIN@US.SERVICER.SHOP.COM.NET.BIZ.DOT.ETC...
CLT DEFINE B35 01    TAD PLASTER           0123456789      1234     BOI  08/12/11
  TAD.PLASTER@US.SERVICER.SHOP.COM.NET.BIZ.DOT.ETC...
--- PF KEYS ↵ -----------------------------------------------------------------
  1 POCH 10 BEFORE MAINT 12 DELETE MAINT 12 FROM 14 MENU
```

FIG. 7

SYSTEMS AND METHODS FOR CONTACT MANAGEMENT

CROSS-REFERENCE TO RELATED APPLICATIONS

This application claims priority to U.S. Provisional Patent Application No. 61/586,006, filed Jan. 12, 2012, which is incorporated by reference in its entirety.

REFERENCE TO COMPUTER PROGRAM LISTING APPENDIX

This application includes a computer program listing appendix, submitted on compact disc (CD). The content of the CD is incorporated by reference in its entirety and accordingly forms a part of this specification. The CD contains the following files:
  File name: Admin.vb; File Size: 37 KB
  File name: Agent.vb; File Size: 22 KB
  File name: Menus.vs; File Size: 7 KB
  File name: SpotLight.sql; File Size: 8 KB
  File name: Spotlight.vs; File Size: 32 KB
  File name: SpotLightService.cpp; File Size: 20 KB
  File name: Super.vb; File Size: 36 KB
  Creation date for CD: Jan. 11, 2013
Those with skill in the art having the benefit of this disclosure will understand that the appended source code may be modified as necessary for use with operating systems other than the operating system for which it is currently written. For example, the appended source code may be modified for use with any Macintosh operating system.

BACKGROUND OF THE INVENTION

1. Field of the Invention

This invention generally relates to contact management, and more particularly, but not by way of limitation, to systems and methods for contact management, such as those, for example, configured to identify a point-of-contact to which at least one contact is assigned and/or configured to order at least one contact based on information relating to the at least one contact.

2. Description of the Related Art

An examples of a contact management system is disclosed in U.S. Pat. No. 6,956,941.

SUMMARY OF THE INVENTION

This disclosure includes embodiments of contact management systems. For example, embodiments of the present contact management systems can be configured to identify a point-of-contact to which at least one contact is assigned. Additionally, or alternatively, embodiments of the present contact management systems can be configured to order and/or prioritize at least one contact based on information—such as name, account number, contact history, duration of hold time, and point-of-contact, among other things—relating to the at least one contact.

Some embodiments of the present contact management systems comprise a server configured to receive and queue at least one contact, receive primary information relating to the at least one contact, and assign one or more identifiers to the primary information such that the server can determine a contact priority identifier for the at least one contact based on the one or more identifiers; and determine an order in which the at least one contact is queued with respect to a point-of-contact to which the at least one contact is assigned, if any, based on the at least one contact's contact priority identifier.

Some embodiments of the present contact management systems comprise an account database having supplemental information relating to contacts; and a server configured to receive and queue at least one contact, receive primary information relating to the at least one contact, access the account database to identify supplemental information relating to the at least one contact, if any, based on the primary information, identify medium-of-contact information, assign one or more identifiers to at least one of the primary information, the supplemental information, and the medium-of-contact information such that the server can determine a contact priority identifier for the at least one contact based on the one or more identifiers, and determine an order in which the at least one contact is queued with respect to a point-of-contact to which the at least one contact is assigned, if any, based on the at least one contact's contact priority identifier.

Some embodiments of the present contact management systems comprise an account database having supplemental information relating to contacts; a server configured to receive and queue at least one contact, receive primary information relating to the at least one contact, access the account database to identify supplemental information relating to the at least one contact, if any, based on the primary information, identify medium-of-contact information, assign one or more identifiers to the primary information, the supplemental information, and the medium-of-contact information relating to the at least one contact such that the server can determine a contact priority identifier for the at least one contact based on the one or more identifiers, and determine an order in which the at least one contact is queued with respect to a point-of-contact to which the at least one caller is assigned, if any, based on the at least one contact's contact priority identifier; an agent workstation configured to interface with the server, the agent workstation configured to receive and queue the at least one contact and further configured to display information relating to the at least one contact when the at least one contact is received and queued; and a supervisor workstation configured to interface with the server and further configured to display information relating to the agent workstation.

Some embodiments of the present contact management systems comprise an account database having supplemental information relating to contacts; a server configured to receive and queue at least one contact, receive primary information relating to the at least one contact, access the account database to identify supplemental information relating to the at least one contact, if any, based on the primary information, identify medium-of-contact information, assign one or more identifiers to at least one of the primary information, the supplemental information, and the medium-of-contact information relating to the at least one contact such that the server can determine a contact priority identifier for the at least one contact based on the one or more identifiers, and determine an order in which the at least one contact is queued with respect to a point-of-contact to which the at least one caller is assigned, if any, based on the at least one contact's contact priority identifier; an agent workstation configured to interface with the server, the agent workstation configured to receive and queue the at least one contact and further configured to display information relating to the at least one contact when the at least one contact is received and queued; a supervisor workstation configured to interface with the server and further configured to display information relating to the agent workstation; an outbound campaign database configured to interface with the server, where at least one of the server and the outbound campaign database is configured to prepare an outbound campaign for an agent when there is an outbound contact; and a reporting database comprising information relating to primary information, supplemental information, medium-of-contact information, information from the agent workstation, information from the supervisor workstation, and information from the outbound campaign.

Some embodiments of the present methods comprise receiving and queuing one or more contacts in a contact management system; receiving primary information from each of the one or more contacts; determining a point-of-contact to which each of the one or more contacts is assigned, if any; assigning one or more identifiers to the primary information of each of the one or more contacts; determining a contact priority identifier for each of the one or more contacts based in part on the respective primary information; and ordering each of the one or more contacts with respect to the respective point-of-contact based on the respective contact priority identifier.

The terms "coupled" and "interface" are defined as connected, although not necessarily directly, and not necessarily mechanically or electrically. Two items are "couplable" or interfaceable if they can be coupled to or interfaced with each other. Unless the context explicitly requires otherwise, items that are couplable are also decouplable, and vice-versa. One non-limiting way in which a first structure is couplable or interfaceable to a second structure is for the first structure to be configured to be coupled to or configured to be interfaced with the second structure.

The terms "a" and "an" are defined as one or more unless this disclosure explicitly requires otherwise.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

The term "determine" (and any form of determine, such as "determines," "determined," and "determining") is used broadly throughout this disclosure to include the receiving or gathering of information and any resulting calculations with and/or manipulations of such information and should include terms (and derivatives of such terms) such as detecting, measuring, identifying, receiving, and similar terms.

Any embodiment of any of the systems and methods can consist of or consist essentially of—rather than comprise/include/contain/have—any of the described elements, features, and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures illustrate the described elements using graphical symbols that will be understood by those of ordinary skill in the art.

FIG. 7 depicts a display of account information stored or otherwise saved in a database of some embodiments of the present contact management systems.

DESCRIPTION OF ILLUSTRATIVE EMBODIMENTS

Figure 1:
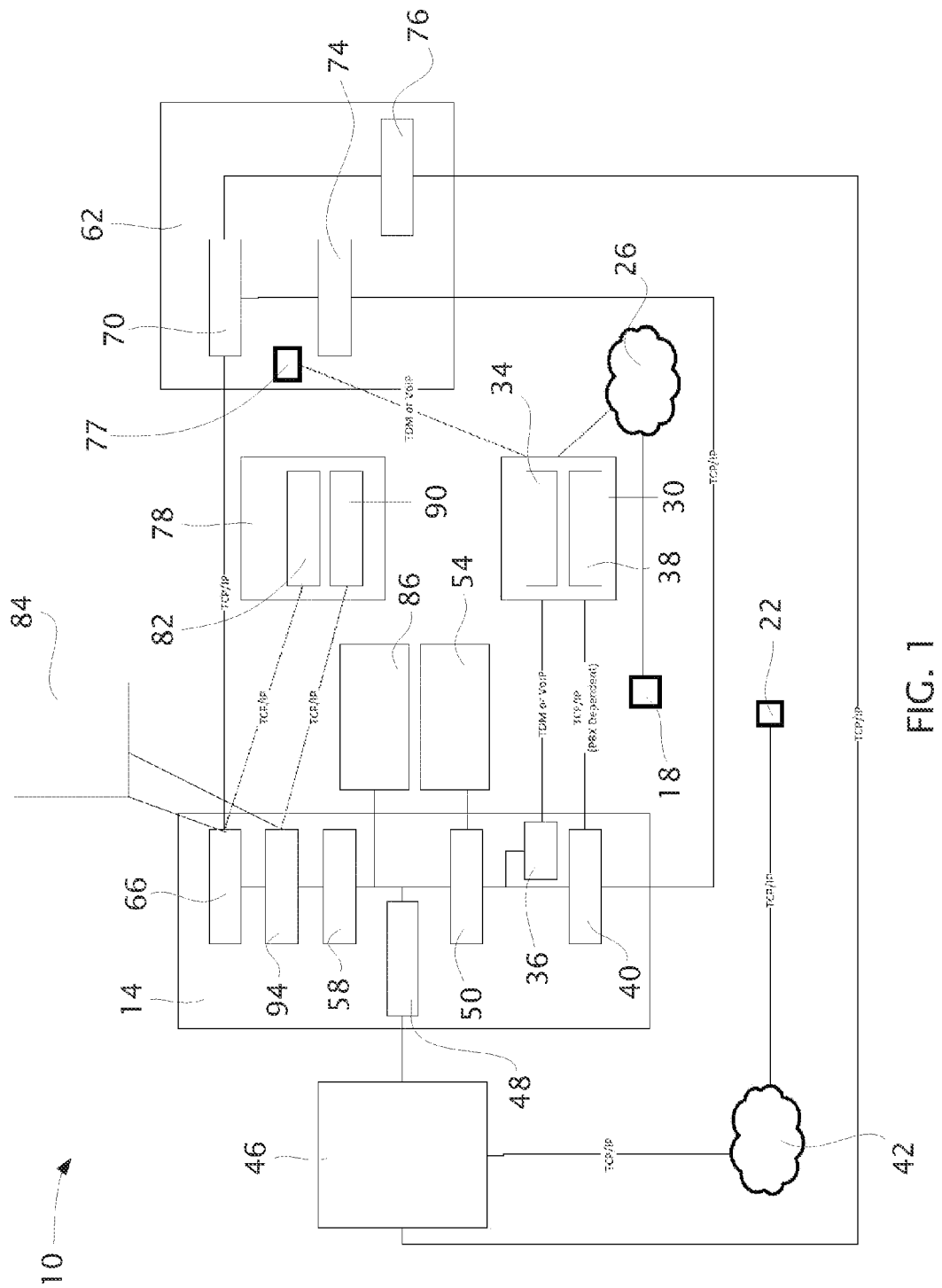
FIG. 1 depicts one embodiment of the present contact management systems.
Figure 2D:
FIGS. 2A-3D depict some identifiers of the present contact management systems.
Figure 3A:
Figure 3B:
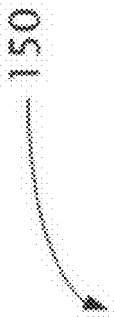
Figure 3D:
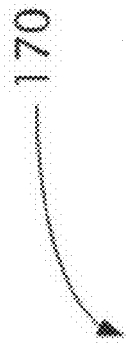

Referring now to FIG. 1, designated by reference numeral 10 is one embodiment of the present contact management systems. In some embodiments, system 10 can stand alone; and in other embodiments, system 10 can be integrated into existing systems, such as existing interactive voice response (IVR) applications, phone switch systems, contact management systems, and the like. In the embodiment shown, contact management system 10 comprises server 14. Server 14 is configured to receive and/or queue at least one contact, such as indirectly or directly from contact medium 18 and/or contact medium 22, in the embodiment shown.

Server 14 can receive a contact from a variety of contact mediums. For example, contact medium 18 may take the form of a telephone. In the embodiment shown, server 14 is configured to receive a contact from contact medium 18 through public switched telephone network (PSTN) 26. PSTN 26 can—but is not required to—interface with private branch exchange (PBX) 30. In the embodiment shown, PBX 30 comprises telephony interfaces 34 and computer-telephony integration interfaces (CTI) 38. In other embodiments, PBX 30 does not comprise a telephony interface. Telephony interface 34 can be configured to interface with telephony interfaces 36 of server 14. CTI 38 can be configured to interface with CTI 40 of server 14. As with other components of system 10, PBX 30 can, for example, interface with server 14 via time division multiplexing (TDM), voice over internet protocol (VoIP), transmission control protocol (TCP), and/or internet protocol (IP).

As another example, contact medium 22 may take the form of a personal computer, smart phone, tablet, and/or similar device configured to access a network and/or the internet. In some embodiments, contact medium 22 can interface directly with server 14 (e.g., via internet 42). In the embodiment shown, server 14 is configured to receive a contact from contact medium 22 (e.g., via internet 42) indirectly through multimedia server 46 (e.g., via TCP/IP). In the embodiment shown, multimedia server 46 is configured to receive, queue, and/or process contacts from a variety of sources such as, for example, e-mail, website submissions, social media chats, messages, and/or posts (e.g., Facebook®, Twitter®, etc.), SMS messages, MMS messages, and similar sources. Server 14 can comprise key word analyzer 48 configured to interface with multimedia server 46. Key word analyzer 48 can be configured to interpret and/or analyze information received from non-verbal mediums of contact to permit server 14 to appropriately receive, queue, and/or process a contact, and to permit server 14 to perform other functions discussed in detail below.

Federal laws and regulations, state laws and regulations, company policy or practice, and/or similar laws, rules, regulations, or recommended practices may recommend or require a point-of-contact for a given contact, such as a loan borrower. In the embodiment shown, a contact received and/or queued by server 14 can have a point-of-contact, such as an agent or group of agents. In other embodiments, the contact does not have a point-of-contact. In some embodiments, the determination that a contact has a point-of-contact can be made prior to the contact being received and/or queued by server 14. Such a determination can be made by another system, such as an initial IVR application. In other embodiments, server 14 can be configured to determine whether a contact has a point-of-contact, if any, and further to identify a point-of-contact for a received and/or queued contact. As an example, one or more components of system 10—such as server 14 and/or another IVR component—can be configured to identify a point-of-contact based on primary information, supplemental information, and/or medium-of-contact information (discussed in detail below).

In the embodiment shown, one or more components of system 10 (e.g., server 14) is configured to receive primary information relating to at least one contact, such as when at least one contact is received and/or queued by server 14. Server 14 comprises IVR application 50, which is configured to interact with a contact such that server 14 can receive primary information, such as by innate characteristics of a contact (e.g., telephone number), by presenting menu options to a contact, by permitting an agent to input contact information, etc. For example, primary information can comprise information relating to a medium of contact, such as telephone number, e-mail address, username, pin number, internet protocol address, and/or similar information. As another example, primary information can comprise information input by a contact and/or by one or more agents (e.g., a point-of-contact), such as, for example, telephone number, e-mail address, username, pin number, internet protocol address, name, account number, social security number, birthdate, loan number, loan amount, lender name, Investor Code, number of delinquent days on a loan, and/or point-of-contact name.

In the embodiment shown, system 10 further comprises account database 54 having supplemental information relating to contacts, such as by virtue of the supplemental information being stored or otherwise saved in account database 54 (e.g., as depicted by numeral 500 in FIG. 7). Server 14 is configured to access account database 54 (and/or a secondary database, as discussed further below) to identify supplemental information, if any, relating to contacts received and/or queued by server 14. Supplemental information can comprise historical information relating to contacts, such as, for example, telephone numbers, e-mail addresses, usernames, pin numbers, internet protocol addresses, names, account numbers, social security numbers, birthdates, loan numbers, loan amounts, lender names, Investor Codes, number of delinquent days on loans, point-of-contact names, total number of attempted contacts, total number of successful contacts, number of attempted contacts within a predetermined time period, number of attempted contacts received after an outbound attempt, medium of contact, result of contacts, and/or information requested by a contact during previous contacts. In the embodiment shown, server 14 can be configured to identify the supplemental information based on at least some of the primary information, such as by using at least some of a contact's primary information when accessing account database 54 to determine supplemental information related to a contact's primary information. Server 14 can further be configured to save/store information relating to contacts in account database 54.

In the embodiment shown, one or more components of system 10 (e.g., server 14) can be configured to identify medium-of-contact information. For example, medium-of-contact information includes information relating to the medium of contact, such as duration of hold time equal to or in excess of a threshold time, a number of voicemails equal to or in excess of a threshold number of voicemails, a number of messages equal to or in excess of a threshold number of messages, a number of attempted contacts equal to or in excess of a threshold number of attempted contacts, and the like. Thresholds for medium-of-contact information can be adjustable.

In the embodiment shown, server 14 is also configured to assign one or more identifiers (e.g., numerical identifiers) to at least some of the primary information, the supplemental information, and/or the medium-of-contact information. Various non-limiting examples of primary information, supplemental information, and/or medium-of-contact information and examples of corresponding identifiers are depicted in numerals 100, 110, 120, 130, 140, 150, 160, and 170 of FIGS. 2A-3D. Further, server 14 is configured to determine a contact priority identifier. For example, in the embodiment shown, server 14 comprises scoring engine 58 configured to determine a contact priority identifier. A contact priority identifier can be used by server 14 and/or an agent workstation (discussed in detail below) to determine an order of contacts with respect to a point-of-contact, such as an order in which a point-of-contact—and, more specifically, an agent workstation—receives contacts. For example, in embodiments where the one or more identifiers comprise numbers/values, a contact priority identifier can be determined by adding (summing) the one or more identifiers. In other embodiments, a contact priority identifier can be determined by any suitable algorithm configured to improve ordering and/or prioritization of contacts with respect to a point-of-contact. Furthermore, the one or more identifiers can be adjustable to improve ordering and/or prioritization of contacts with respect to a point-of-contact. In still other embodiments, server 14 can be configured to determine contact priority identifiers dynamically, such as, for example, by updating a contact priority identifier at predetermined time intervals, or by adjusting the value of one or more identifiers as particular information becomes more or less valuable in determining a contact priority identifier. As an example, medium-of-contact information can change while a contact is queued, such as due to an increasing amount of time during which a contact is on hold. Server 14 can be configured to update (e.g., reassign, increase, or decrease) the one or more identifiers for at least some of the medium-of-contact information such that server 14 can determine an updated contact priority identifier. For example, file names SpotLight.sql, Spotlight.vs, and SpotLightService.cpp in the attached CD of source code provide one implementation of the described functionality, including, but not limited to, point of contact identification, contact priority identifier determination, database definitions, client application management, and server software, among other things.

In the embodiment shown, system 10 further comprises at least one agent workstation 62 (e.g., one, two, three, four, or more agent workstations). For example, in the embodiment shown, agent workstation 62—and more specifically, agent application 70—is configured to interface with server 14—and more specifically, workstation server 66—via TCP/IP. Agent workstation 62—and more specifically, CTI client server 74—can also be configured to interface with CTI server 40 of server 14 (e.g., via TCP/IP). Further, agent workstation 62—and more specifically, multimedia client server 76—can be configured to interface with multimedia server 46 (e.g., via TCP/IP). Agent workstation 62 can comprise contact medium 77 (e.g., a telephone) that is configured to interface (e.g., via TDM or VoIP) with PBX 30, such as to receive contacts via PBX 30. In the embodiment shown, agent workstation 62 is configured to receive and/or queue at least one contact based on the contact's contact priority identifier, provided an agent is available to receive contacts.

Figure 5:
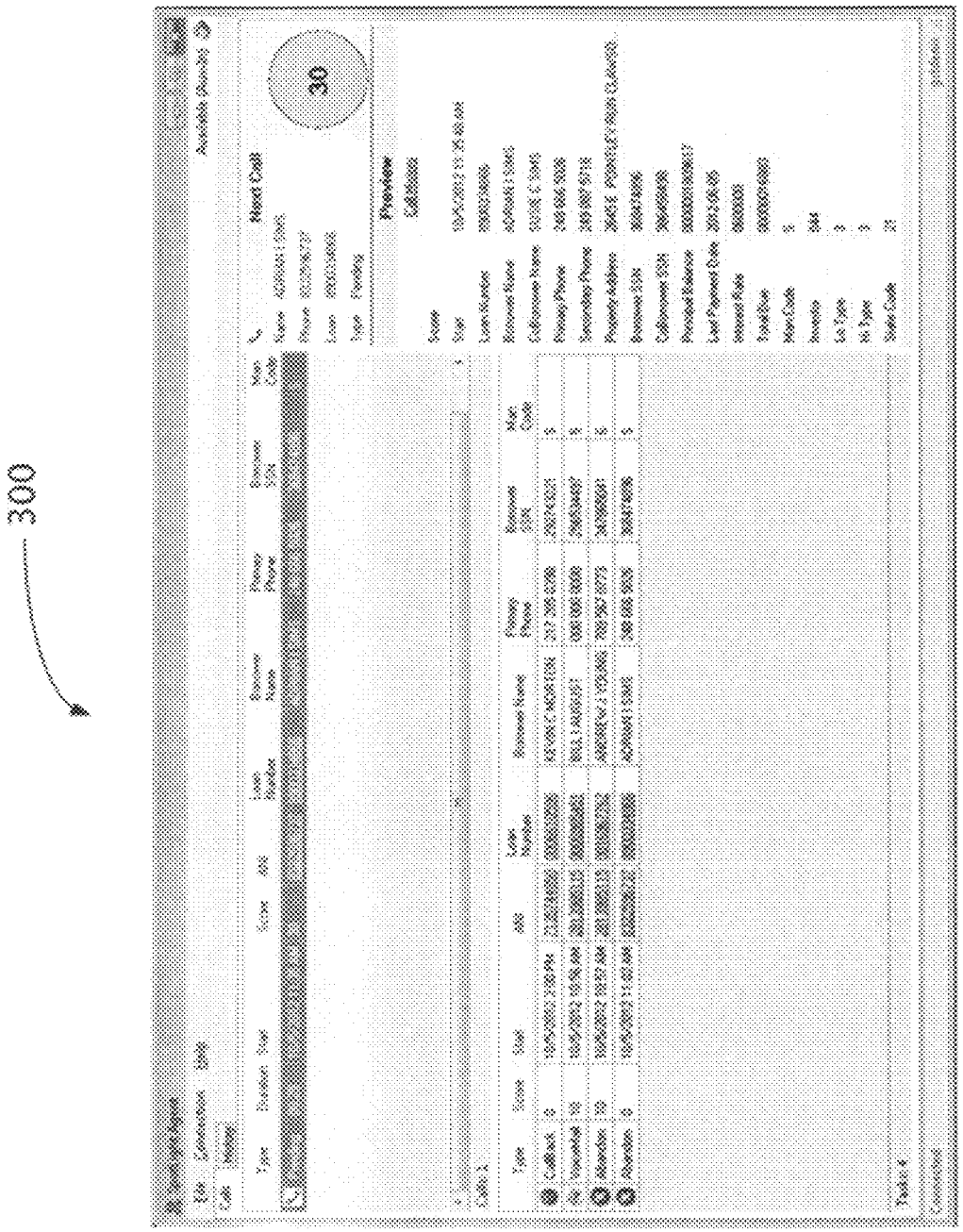
FIG. 5 depicts an agent workstation display of some embodiments of the present contact management systems.

In some embodiments, server 14 is configured to determine whether an agent (e.g., a point-of-contact) is available at agent workstation 62 prior to transferring a contact to agent workstation 62 or to a device associated with agent workstation 62 (e.g., a telephone). System 10 can be configured such that, in the event that an agent is unavailable, the system will provide a contact with appropriate alternative options, some of which are described in detail below. In some embodiments, one or more agents can be permitted to adjust the order in which contacts are queued for agent workstation 62 and/or the order in which the one or more agents receive queued contacts, notwithstanding the contact priority identifier. Agent workstation 62 is further configured to display information—such as primary information, supplemental information, and/or medium-of-contact information—relating to at least one contact after the contact is received and/or queued (e.g., as depicted by display 300 in FIG. 5). In addition to displaying primary information, supplemental information, and/or medium of contact information, agent workstation 62 can also display, for example, information relating to date of contact, time of contact, number of contacts received and/or queued, history of contacts received and/or queued for the agent workstation, duration of a current contact, and/or history of previous contacts. In other embodiments, agent workstation 62 can be configured to permit an agent to input comments regarding a contact, such that, for example, the comments are associated with the contact and optionally saved/stored in account database 54 and/or one or more other similar databases for future use. File name Agent.vb in the attached CD of source code provides one implementation of agent workstation functionality.

Figure 6:
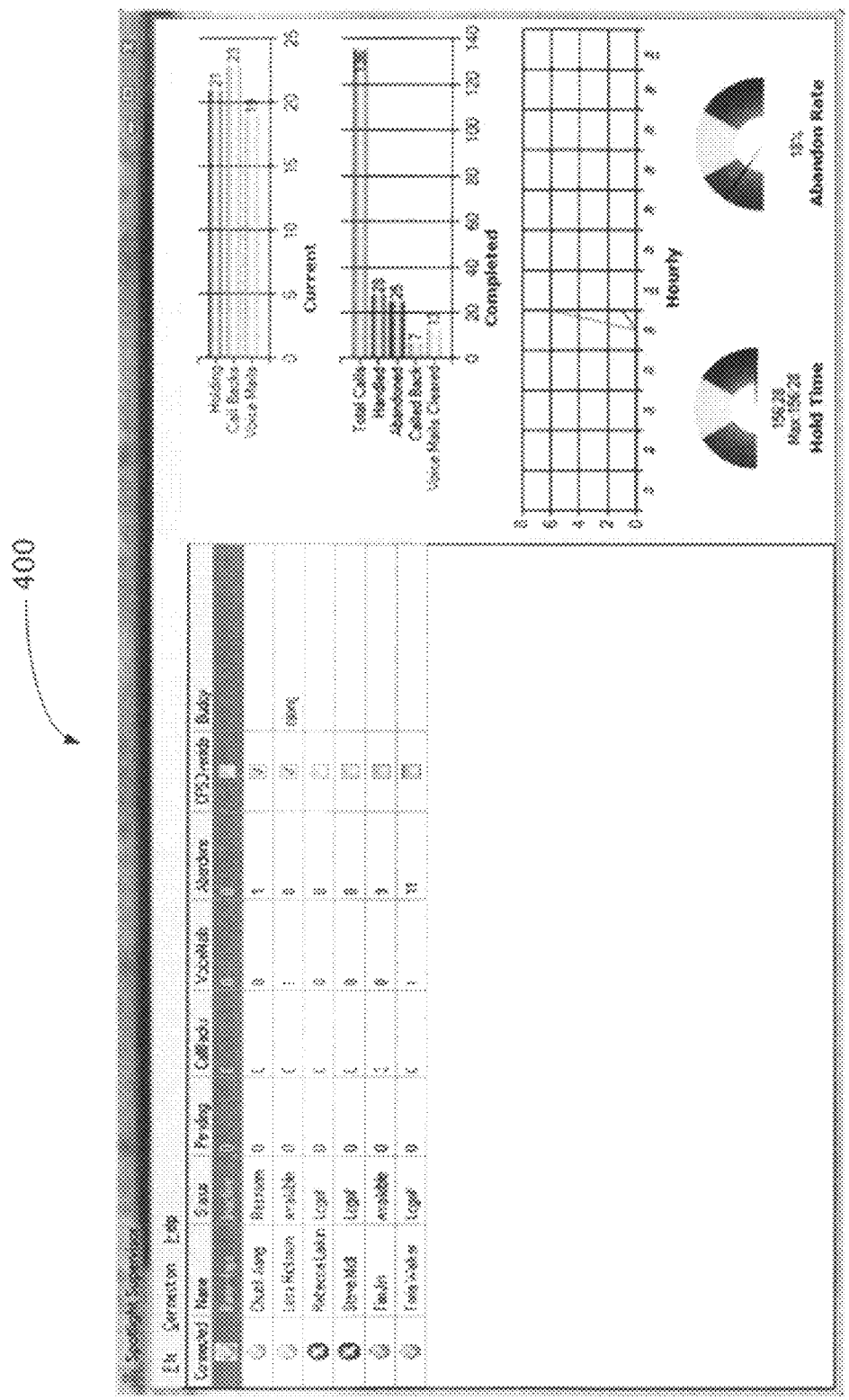
FIG. 6 depicts a supervisor workstation display of some embodiments of the present contact management systems.
Figure 8:
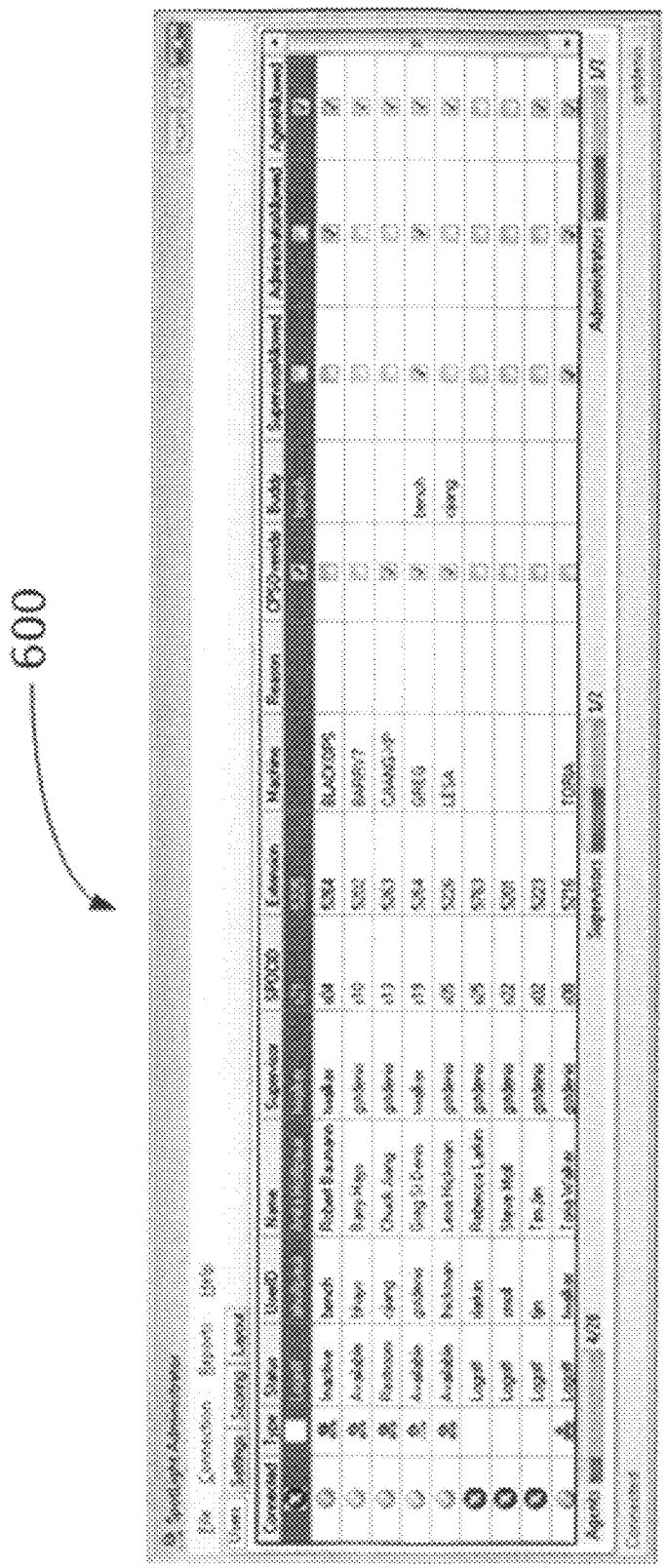
FIGS. 8-11 depict administrator workstation displays and/or parameters that can be selected and/or edited by one or more administrators, consistent with the use of some embodiments of the present contact management systems.
Figure 9:
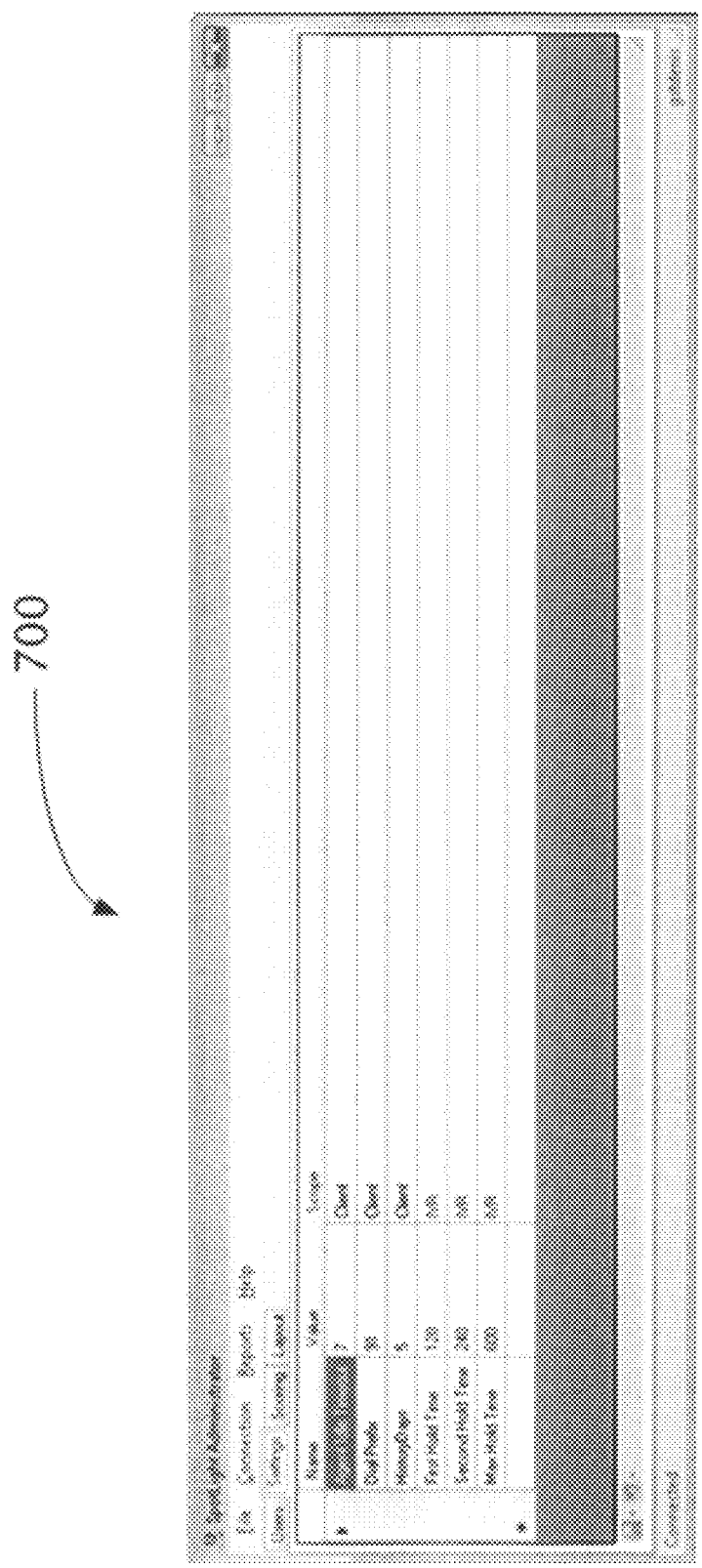
Figure 10:
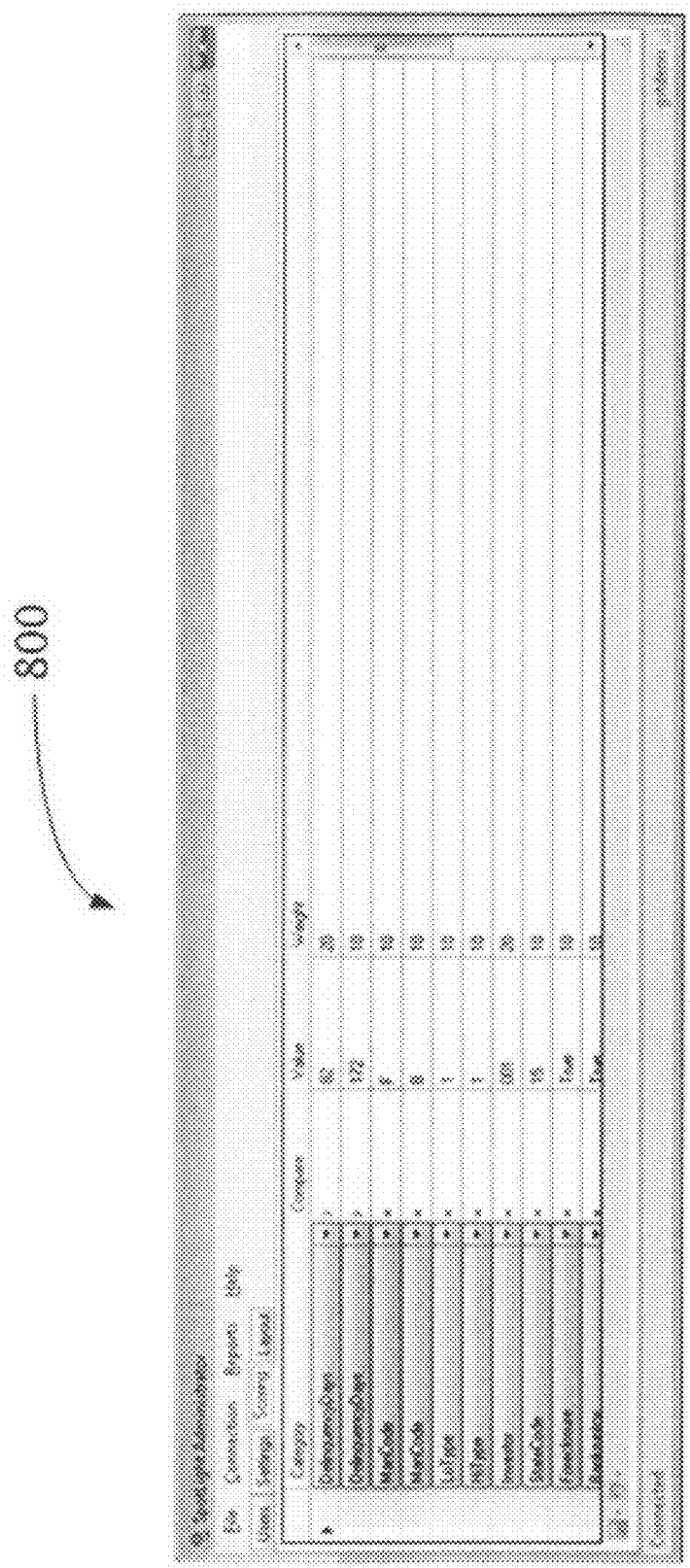
Figure 11:
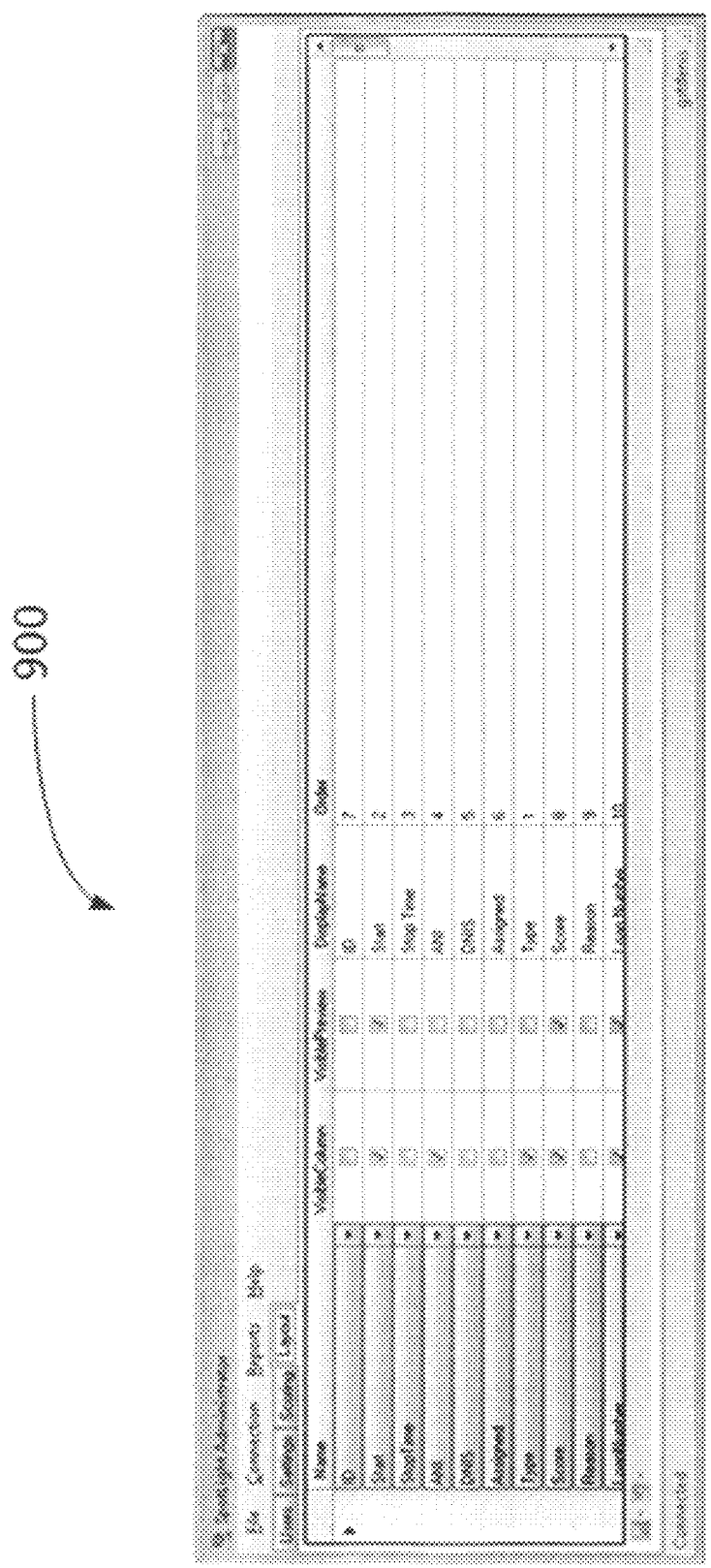

In the embodiment shown, system 10 further comprises at least one supervisor workstation 78 (e.g., one, two, three, four, or more supervisor workstations). For example, in the embodiment shown, supervisor workstation 78—and more specifically, supervisor application 82—is configured to interface with server 14—and more specifically, workstation server 66—via TCP/IP. Supervisor workstation 78 is configured to display information relating to at least one agent workstation 62 (e.g., one, two, three, four, or more agent workstations) and/or information relating to one or more received/queued contacts, such as primary information, supplemental information, medium of contact information, and/or combinations thereof (e.g., as depicted by display 400 in FIG. 6). For example, supervisor workstation 78 can be configured to display information relating to agent names, agent extensions, total contacts for each agent, total contacts for all agents, average contacts for all agents, pending contacts for each agent, pending contacts for all agents, average pending contacts for all agents, pending call backs for each agent, pending call backs for all agents, average pending call backs for all agents, pending voicemails for each agent, pending voicemails for all agents, average pending voicemails for all agents, abandoned contacts for each agent, abandoned contacts for all agents, average abandoned contacts for all agents, completed contacts for each agent, completed contacts for all agents, average completed contacts for all agents, completed voicemails for each agent, completed voicemails for all agents, average completed voicemails for all agents, total contact hold time for each agent, total contact hold time for all agents, average total contact hold time for all agents, abandon rate for each agent, abandon rate for all agents, and/or average abandon rate for all agents. In some embodiments, one or more agents (e.g., one or more supervisors) using supervisor workstation 78 can be permitted to adjust the order in which an agent using at least one agent workstation 62 receives queued contacts and/or the order in which contacts are queued for one or more agent workstations 62, notwithstanding the contact priority identifier. File name Super.vb in the attached CD of source code provides one implementation of supervisor workstation functionality.

In the embodiment shown, system 10 further comprises at least one administrator workstation 84 (e.g., one, two, three, four, or more administrator workstations). For example, in the embodiment shown, administrator workstation 84 is configured to interface with server 14. Administrator workstation 84 is configured to display information relating to at least one agent workstation 62 (e.g., one, two, three, four, or more agent workstations), information relating to at least one supervisor workstation 78 (e.g., one, two, three, four, or more supervisor workstations), and/or information relating to one or more received/queued contacts, such as primary information, supplemental information, medium of contact information, and/or combinations thereof (e.g., as depicted by displays 600, 700, 800, and 900 in FIGS. 8, 9, 10, and 11, respectively). Further, administrator workstation 84 can be configured to permit an administrator to select and/or edit various parameters, such as, for example, identifiers assigned to primary information, supplemental information, medium of contact information, and/or combinations thereof. Administrator workstation 84 can be further configured to permit an administrator to select and/or edit other parameters, such as, timing thresholds, reporting options, display items to be displayed at agent workstation 62 and/or supervisor workstation 78, whether to edit the order in which a contact is queued (and/or whether to permit an agent and/or supervisor to edit the order in which a contact is queued). File name Admin.vb in the attached CD of source code provides one implementation of administrator workstation functionality.

In the embodiment shown, system 10 also comprises outbound campaign database 86 configured to interface with server 14. At least one of server 14 and outbound campaign database 86 is configured to prepare one or more outbound campaigns (e.g., comprising one or more outbound contacts) when there is at least one outbound contact, such as a contact suggested to be contacted. For example, server 14 can be configured to assign one or more outbound identifiers to at least some of the primary information, supplemental information, and/or medium-of-contact information relating to at least one outbound contact such that server 14 can determine an outbound priority identifier based on the one or more outbound identifiers. The outbound priority identifier can in part represent an order—such as a priority—in which outbound campaigns and/or at least one outbound contact should be addressed by system 10 and/or by one or more agents. Similarly to a contact priority identifier, an outbound priority identifier can comprise a numerical value. Server 14 can be configured to add (sum) one or more outbound identifiers to determine the outbound priority identifier and to determine an order for outbound contacts based on an outbound contact's outbound priority identifier. In other embodiments, an outbound priority identifier can be determined by any suitable algorithm configured to improve ordering and/or prioritization of outbound contacts with respect to a point-of-contact As with contact priority identifiers, an agent—such as, for example, an agent at agent workstation 62 or a supervisor at supervisor workstation 78—can be permitted to adjust outbound priority identifiers and/or can adjust the order in which at least one outbound contact exists in an outbound campaign.

Figure 12:
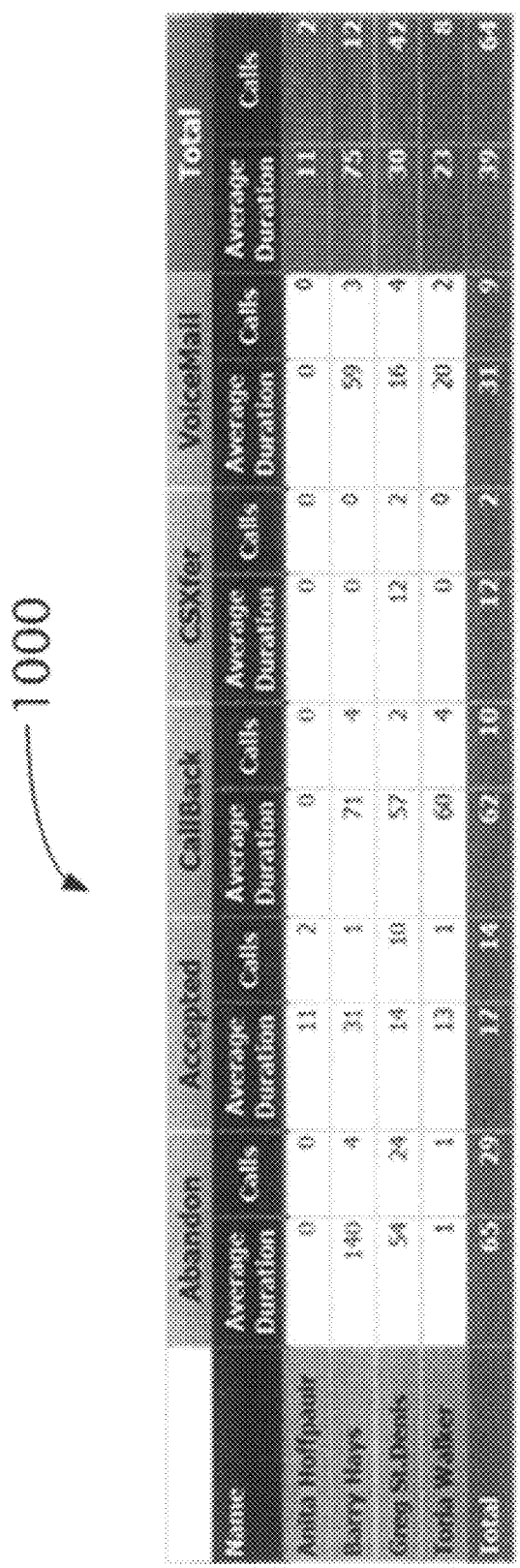
FIG. 12 depicts a report that can be produced using some embodiments of the present contact management systems.

In the embodiment shown, system 10—and more specifically server 14—is configured to produce one or more reports, such as report 1000 depicted in FIG. 12. For example, supervisor workstation 78 comprises reporting application 90, which is configured to generate a report and interfaced with database 94 of server 14 (e.g., via TCP/IP). In other embodiments, agent workstation 62 can also comprise a reporting application configured to interface with database 94 of server 14. Reporting application 90 can be configured to use information from agent workstation 62, supervisor workstation 78, and/or server 14, to generate a report (e.g., on-demand or at a pre-scheduled time) that comprises information relating to primary information, supplemental information, medium-of-contact information, information from the at least one agent workstation, information from the at least one supervisor workstation, and/or information from the outbound campaign. For example, in some embodiments, system 10—and more specifically reporting application 90—can be configured to produce a report by loan number, and the report can include information relating to an agent identification number, time of contact, duration of queue for a contact, time an agent received a contact, duration of contact between agent (e.g., a point-of-contact) and a contact, time of outbound contact, whether a contact was transferred, and/or time of transfer. In other embodiments, system 10—and more specifically reporting application 90—can be configured to produce a report by point-of-contact, and the report can include information relating to total contacts, average contacts, total duration of all contacts, average duration of all contacts, average duration of each contact, number of outbound contacts, number of abandoned contacts, and/or number of messages (e.g., voicemail and/or textual) received. In still other embodiments, system 10—and more specifically reporting application 90—can be configured to produce a report by agent, and the report can include information relating to borrower name, borrower loan number, time of contact, duration of queue for a contact, time an agent received a contact, duration of contact between agent and a contact, time of outbound contact, whether a contact was transferred, time of transfer, and/or information received by contact (if information is provided while the contact is queued). File name Admin.vb in the attached CD of source code provides one implementation of reporting functionality (e.g., a reporting interface).

Figure 4:
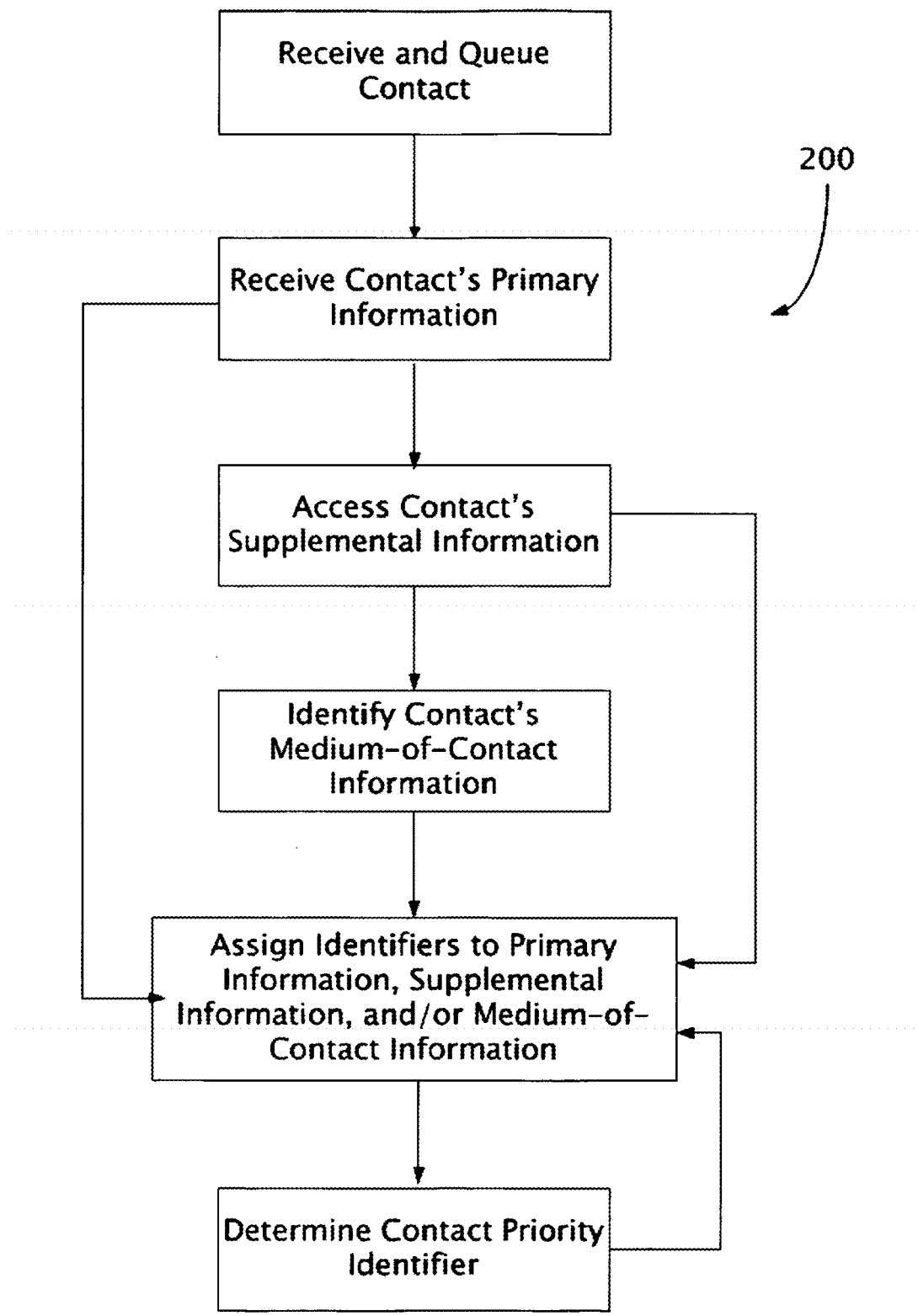
FIG. 4 depicts a flow diagram of functions that some embodiments of the present contact management systems can perform.

The present disclosure also includes methods for contact management, such as the method 200 depicted in FIG. 4. Such methods comprise, for example, receiving and queuing one or more contacts in a contact management system (e.g., contact management system 10); receiving primary information from each of the one or more contacts; determining a point-of-contact (e.g., an agent or a group of agents) to which each of the one or more contacts is assigned, if any (e.g., using server 14 and/or another component of system 10 (e.g., an IVR application)); assigning one or more identifiers to the primary information of each of the one or more contacts; determining a contact priority identifier for each of the one or more contacts based in part on the respective primary information; and/or ordering each of the one or more contacts with respect to the respective point-of-contact based on the respective contact priority identifier. In some embodiments, the present methods can further comprise accessing supplemental information relating to the one or more contacts, if any—such as supplemental information that is stored within account database 54; assigning one or more identifiers to the supplemental information of each of the one or more contacts; and/or determining a contact priority identifier for each of the one or more contacts based in part on the respective supplemental information. In some embodiments, the supplemental information is accessed by server 14 based on the primary information. In still other embodiments, the present methods further comprise identifying medium-of-contact information—such as using server 14—relating to the one or more contacts; assigning one or more identifiers to the medium-of-contact information of each of the one or more contacts; and determining a contact priority identifier for each of the one or more contacts based in part on the respective medium-of-contact information. In some embodiments, the methods comprise updating (e.g., dynamically) the medium-of-contact information relating to each of the one or more contacts; assigning one or more identifiers to the updated medium-of-contact information of each of the one or more contacts; and determining a contact priority identifier for each of the one or more contacts based in part on the respective updated medium-of-contact information.

In some embodiments, the present methods can also comprise assigning the one or more contacts to an agent workstation (e.g., agent workstation 62); displaying the primary information, the supplemental information, and/or the medium of contact information at the agent workstation; displaying information from the agent workstation (e.g., agent workstation 62) at a supervisor workstation (e.g., supervisor workstation 78); storing primary information, supplemental information, and/or medium-of-contact information in an account database (e.g., account database 54 and/or database 94); and/or generating a report relating to primary information, supplemental information, and/or medium-of-contact information.

EXAMPLES

By way of illustration and not limitation, the following description provides an example of some embodiments of the contact management systems of the present disclosure. Available in the computer program listing appendix (see CD filed concurrently with this application and incorporated by reference) is source code, configured to implement aspects of embodiments of the present systems and methods. Those of ordinary skill in the art having the benefit of this disclosure will recognize that a wide variety of computational techniques and/or different types of corresponding source code may be used for the same purpose. This provided source code is exemplary only and does not limit the scope of the claims.

For example, a contact (e.g., a borrower) with a point-of-contact (e.g., one assigned agent or an assigned group of agents) can be transferred to an IVR (e.g., IVR application 50) via a switchboard, a PBX, another IVR application, a customer service agent, and the like. A server (e.g., server 14) can receive primary information, supplemental information, and/or medium-of contact information relating to the contact, such as information that is received by IVR application 50, an agent, or some other component. A contact can be automatically transferred to an agent if, for example, the contact's point-of-contact is "available" (e.g., not assisting another contact, or present at an agent workstation 62). If the contact's point-of-contact is unavailable, a system component—such as IVR application 50 or some other component of system 10—can present options and/or information to the contact, such as, for example, whether to: remain queued (e.g., on hold); receive information, such as information regarding a contact's loan, if any, a point-of-contact name, hold time, information to apply for loan modifications, loan modification status updates, attorney contact information, and similar information; schedule an outbound contact; and/or leave a message for the point-of-contact. A contact continuing to be queued (e.g., on hold) can be presented appropriate options at predetermined intervals, one implementation of which is provided by file name Menus.vs in the attached CD of source code. In some embodiments, a system component—such as, for example, IVR application 50 or some other component of system 10—can be configured to receive and/or store information from a contact in response to the options. For example, the system in such circumstance may permit a contact to input information relating to an outbound campaign, such as phone number, outbound contact time, and the like.

Further, an agent workstation (e.g., agent workstation 62) can display (e.g., dynamically) primary information, supplemental information, and/or medium-of-contact information relating to one or more contacts, such as contacts that are queued (e.g., on hold) for the agent workstation or outbound contacts, and the displayed information may include voicemail and/or messages received, account information, loan information, borrower name, phone number, hold time, Investor Code, delinquent days on a loan, if any, to name a few. For example, the agent workstation (e.g., agent workstation 62) can be configured such that an agent can access such information prior to receiving a contact (e.g., while the contact remains queued). As another example, to receive a contact and/or to initiate an outbound contact, agent workstation 62 can be configured such that an agent can select a contact via the display. Agents can also perform other tasks using the agent workstation (e.g., agent workstation 62), such as initiating outbound campaigns, transferring contacts (e.g., to supervisor workstation 78), receiving voicemails and/or messages, and the like.

Similarly, other agents (e.g., supervisors) can view primary information, supplemental information, and medium-of-contact information relating to one or more contacts and/or information relating to the agent workstation (e.g., agent workstation 62) using a supervisor workstation (e.g., supervisor workstation 78). In some supervisor workstation displays, a supervisor can view such information globally such that, for example, the supervisor can view information from all agent workstations; and in other displays, a supervisor can view such information by individual agent. Contacts that would ordinarily be received and/or queued by an agent and/or an agent workstation can also be received and/or queued by a supervisor and/or a supervisor workstation. As another example, a supervisor can reassign a contact to another agent, including another supervisor, via supervisor workstation 78.

By way of illustration and not limitation, the following description provides another example of an embodiment and/or a method using the contact management systems of the present disclosure. A contact can contact system 10 by telephone. For example, a contact can dial a telephone number that connects the contact with a customer service agent or a PBX, such as PBX 30. A customer service agent and/or PBX 30 can route the call to an IVR application, such as IVR application 50 interfaced with server 14. The IVR application can perform greeting and/or authenticating functions, such as, for example, identifying primary information, supplementary information, and medium-of-contact information relating to the contact. Once authenticated, a server (e.g., server 14) can identify whether the caller has a point-of-contact—such as, for example, by accessing account database 54 or by using primary information—and can send a signal that indicates a new contact to a database (e.g., database 94). A workstation server (e.g., workstation server 66) is configured to detect the signal in the database (e.g., database 94). The workstation server is also configured to signal an agent workstation (e.g., agent workstation 62) regarding the new contact, which in turn signals an agent at the agent workstation.

The IVR application, such as IVR application 50, is configured to, meanwhile, present options to the contact. In some embodiments, an agent—such as a point-of-contact—receives the call because the caller's contact priority identifier exceeds that of other contacts with respect to that agent. In other embodiments, an agent receives the call because no other contact is queued, because the agent and/or a supervisor adjusts the order in which contacts are queued and/or received, or because of other similar reasons. To receive a call, an agent can, for example, select the call in the agent workstation (e.g., agent workstation 62), which signals the workstation server (e.g., workstation server 66) of such action. Workstation server 66 can then signal the IVR application (e.g., IVR application 50) via a database (e.g., database 94) such that the IVR application can initiate a transfer of the contact (e.g., via telephony interfaces 34 and 36, CTI 40, or CTIs 38 and 40).

The systems described above will be understood to comprise computer systems, and the functions described in connection with this disclosure may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with this disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In the some embodiments, the processor and the storage medium may reside as discrete components in a user terminal.

In one or more exemplary designs, the functions described may be implemented in hardware, software, firmware, or any combination thereof. If implemented in software, the functions may be stored as one or more instructions or code on a non-transitory computer-readable storage medium. A storage media may be any available media that can be accessed by a general purpose or special purpose computer or processor. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The use of the foregoing technology allows for the processing of information (e.g., data) that is not possible without the aid of such technology, or at least not at the speed achievable with such technology. Some embodiments of the performance of the disclosed functions may be achieved automatically or otherwise within a certain amount of time, such as an amount of time less than what it would take to perform the function or functions without the use of a computer system, processor, or processors, including, for example and depending on the embodiment, no more than one hour, no more than 30 minutes, no more than 15 minutes, no more than 10 minutes, no more than one minute, no more than one second, and no more than every time interval in seconds between one second and one hour.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present systems and methods are not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A contact management system comprising:
a server comprising at least one processor configured to:
receive and queue at least one contact;
receive primary information relating to the at least one contact; and
an account database having supplemental information;
where the at least one processor is configured to:
access the account database to identify supplemental information relating to the at least one contact, if any, based on the primary information;
identify medium-of-contact information;
assign one or more identifiers to the primary information;
assign one or more identifiers to the supplemental information;
assign one or more identifiers to the medium-of-contact information to enable the server to determine a contact priority identifier for the at least one contact based on the one or more identifiers assigned to the primary information, the one or more identifiers assigned to the supplemental information, and the one or more identifiers assigned to the medium-of-contact information;
update the medium-of-contact information;
determine an order in which the at least one contact is queued with respect to a point-of-contact to which the at least one contact is previously assigned based on the at least one contact's contact priority identifier and the updated medium-of-contact information; and adjust the order in which the at least one contact is queued based on input received at a supervisor workstation in communication with the server.

2. The system of claim 1, where the primary information comprises information input by the at least one contact.

3. The system of claim 2, where information input by the at least one contact comprises at least one of telephone number, e-mail address, username, pin number, internet protocol address, name, account number, social security number, birthdate, loan number, loan amount, lender name, Investor Code, number of delinquent days on a loan, and point-of-contact name.

4. The system of claim 1, where the supplemental information in the account database comprises historical information relating to contacts.

5. The system of claim 4, where the supplemental information comprises at least one of telephone number, e-mail address, username, pin number, internet protocol address, name, account number, social security number, birthdate, loan number, loan amount, lender name, Investor Code, number of delinquent days on a loan, point-of-contact name, total number of attempted contacts, total number of successful contacts, number of attempted contacts within a predetermined time period, number of attempted contacts received after an outbound attempt, medium of contact, result of contact, and information requested by the at least one contact during previous contacts.

6. The system of claim 1, where the one or more identifiers assigned to the primary information, the one or more identifiers assigned to the supplemental information, and the one or more identifiers assigned to the medium-of-contact information comprise numerical values.

7. The system of claim 6, where the at least one processor of the server is configured to add the one or more identifiers assigned to the primary information, the one or more identifiers assigned to the supplemental information, and the one or more identifiers assigned to the medium-of-contact information to determine the contact priority identifier.

8. A contact management system comprising:
an account database having supplemental information relating to contacts; and
a server comprising at least one processor configured to:
receive and queue at least one contact;
receive primary information relating to the at least one contact;
access the account database to identify supplemental information relating to the at least one contact, if any, based on the primary information;
identify medium-of-contact information;
assign one or more identifiers to the primary information, the supplemental information, and the medium-of-contact information to enable the server to determine a contact priority identifier for the at least one contact based on the one or more identifiers;
update the medium of contact information;
determine an order in which the at least one contact is queued with respect to a point-of-contact to which the at least one contact is previously assigned based on the at least one contact's contact priority identifier and the updated medium-of-contact information; and
adjust the order in which the at least one contact is queued based on input received at a supervisor workstation in communication with the server.

9. The system of claim 8, further comprising:
an agent workstation configured to interface with the server, the agent workstation configured to receive and queue the at least one contact and further configured to display information relating to the at least one contact when the at least one contact is received and queued.

10. The system of claim 9, further comprising:
a supervisor workstation configured to interface with the server and further configured to display information relating to the agent workstation.

11. The system of claim 10, further comprising:
an outbound campaign database configured to interface with the server;
where at least one of the server and the outbound campaign database is configured to prepare an outbound campaign for an agent when there is an outbound contact.

12. The system of claim 11, where the at least one processor of the server is configured to assign one or more outbound identifiers to the supplemental information relating to the outbound contact to enable the server to determine an outbound priority identifier based on the one or more outbound identifiers.

13. The system of claim 11, where the at least one processor of the server is configured to produce a report relating to at least one of the primary information, the supplemental information, the medium-of-contact information, information from the agent workstation, information from the supervisor workstation, and information from the outbound campaign.

14. The system of claim 13, further comprising:
a reporting database comprising information relating to the report.

15. A method for contact management comprising:
receiving and queuing, by a server comprising at least one processor, one or more contacts in a contact management system;
receiving, by the server, primary information from each of the one or more contacts;
determining, using the server, a point-of-contact to which each of the one or more contacts is previously assigned;
assigning, using the server, one or more identifiers to the primary information of each of the one or more contacts;
accessing, using the server, supplemental information relating to each of the one or more contacts, if any, based on the primary information;
assigning, using the server, one or more identifiers to the supplemental information of each of the one or more contacts;
identifying, using the server, medium-of-contact information relating to the one or more contacts;
assigning, using the server, one or more identifiers to the medium-of-contact information of each of the one or more contacts; and
determining, using the server, a contact priority identifier for each of the one or more contacts based in part on the respective primary information, the respective supplemental information, and the respective medium-of-contact information;
ordering, using the server, each of the one or more contacts with respect to the respective point-of-contact based on the respective contact priority identifier;
updating, using the server, the medium-of-contact information relating to each of the one or more contacts;
assigning, using the server, one or more identifiers to the updated medium-of-contact information of each of the one or more contacts; and
where the determining, using the server, the contact priority identifier for each of the one or more contacts is also based in part on the respective updated medium-of-contact information; and adjusting the order of each of the one or more contacts based on input received at a supervisor workstation in communication with the server.

\* \* \* \* \*

UNITED STATES PATENT AND TRADEMARK OFFICE
CERTIFICATE OF CORRECTION

Page 1 of 1

PATENT NO. : 9,699,239 B1
APPLICATION NO. : 13/694871
DATED : July 4, 2017
INVENTOR(S) : Barry Hays and Greg St. Denis It is certified that error appears in the above-identified patent and that said Letters Patent is hereby corrected as shown below:

On the Title Page

Item (63) Related U.S. Application Data, Line 1:
Delete "Continuation of" and replace with -- Provisional --.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*